United States Patent [19]
Ohmori et al.

[11] Patent Number: 4,978,977
[45] Date of Patent: Dec. 18, 1990

[54] LASER SCANNER WITH CONJUGATE CONDITION LENS

[75] Inventors: Naoto Ohmori; Yasuhiro Matsuura; Hirofumi Hasegawa; Hiroaki Kojima; Yukio Yamada, all of Osaka, Japan

[73] Assignee: Minolta Camera Kabushiki Kaisha, Osaka, Japan

[21] Appl. No.: 376,826

[22] Filed: Jul. 7, 1989

[30] Foreign Application Priority Data

Jul. 11, 1988 [JP] Japan .................................. 63-172092

[51] Int. Cl.$^5$ ...................... G02B 26/08; G01D 15/16
[52] U.S. Cl. ..................................... 346/108; 350/6.5; 358/302
[58] Field of Search ..................... 346/108, 107 R, 76, 346/160; 358/296, 300, 302; 350/6.8, 6.5, 6.7

[56] References Cited

U.S. PATENT DOCUMENTS

| | | | |
|---|---|---|---|
| 4,084,197 | 4/1978 | Starkweather | 346/108 |
| 4,731,623 | 3/1988 | Oda et al. | |
| 4,733,307 | 3/1988 | Watanabe | 358/302 |

FOREIGN PATENT DOCUMENTS 54-140548 10/1979 Japan .
54-140558 10/1979 Japan .

Primary Examiner—Mark J. Reinhart
Attorney, Agent, or Firm—Price, Gess & Ubell

[57] ABSTRACT

A laser scanning optical system including a rotatable polygonal mirror for scanning the photosensitive surface with the laser beam in a scanning direction, a lens unit for converging the laser beam reflected by the polygonal mirror on the photosensitive surface, a first reflection mirror for reflecting the laser beam passed though the lens unit to the photosensitive surface, a second reflection mirror for reflecting the laser beam reflected by a part of the first reflection mirror, a sensor arranged to receive the laser beam which is reflected by the second reflection mirror and has passed through a specific position equivalent to the photosensitive surface for generating a synchronizing signal for commanding start of modulation of the laser beam, and first and second lens elements both interposed between the specific position and the sensor so as to keep a conjugate condition therebetween. The first lens element has a positive power only in the direction perpendicular to the scanning direction and provides a magnification smaller than 1 in the direction perpendicular to the scanning direction, while the second lens element has a positive power only in the scanning direction and provides a magnification greater than 1 in the scanning direction.

5 Claims, 3 Drawing Sheets

LASER SCANNER WITH CONJUGATE CONDITION LENS

BACKGROUND OF THE INVENTION

1. Field of the Invention

The present invention relates to laser scanning optical systems, and more particularly to laser scanning optical systems having an SOS sensor for providing a synchronizing signal.

2. Description of the Related Art

Conventional laser scanning optical systems include an SOS sensor for providing a synchronizing signal commanding the start of modulation of the laser beam at a specified position without any alteration with respect to the subscanning direction. To assure the SOS sensor of good detecting performance, it is desirable to dispose the sensor at a position where the laser beam is concentrated, so that the sensor is provided usually at a position equivalent to the image receiving surface on which the laser beam is to be concentrated. With laser printers, however, it is not always easy to position the SOS sensor in an equivalent with the surface of the photosensitive member serving as the image receiving surface owing to the interference with other image forming elements.

To overcome this problem, Japanese Laid-Open Paid Application No. 54-140548 discloses an optical disposed at a position beyond a position equivalent to the surface of a photosensitive member, and an optical system comprising a condenser lens for converging a laser beam on the SOS sensor. Nevertheless, the disclosed optical system is merely so adapted as to converge the laser beam with the condenser lens, so that the laser beam projected is likely to deflect from the SOS sensor owing to an inclination of the axis of the polygonal mirror or to errors involved in installing optical elements. FIG. 1 shows an arrangement in which a condenser lens L is interposed between an SOS sensor S and a position A which is equivalent to the photosensitive member and at which a laser beam is concentrated. If the laser beam deflects from the position A by an amount with respect to the subscanning direction, the amount of deflection at the position where the SOS sensor is disposed is expressed by the following equation.

$$\delta' = b/a \cdot \delta$$

Thus, the presence of the condenser lens multiplies the amount of deflection $\delta$ by the magnification (b/a). Accordingly, the disclosed technique has a problem in that there is an increased likelihood of the laser beam deflecting from the light-receiving surface of the SOS sensor and becoming undetectable.

Japanese Laid-Open Patent Application No. 54-140558 discloses an optical system wherein a laser beam is caused to impinge on a polygonal mirror more than once and to impinge on an SOS sensor at an increased scanning speed so as to diminish synchronization errors. However, the disclosed optical system has a complex construction, while the SOS sensor is equivalent to the photosensitive member in position.

SUMMARY OF TO INVENTION

Accordingly, the main object of the present invention is to provide a laser scanning optical system wherein an SOS sensor can be positioned with increased freedom and which is adapted to preclude the laser beam from deflecting from the SOS sensor.

Another object of the invention is to provide a laser scanning optical system including an SOS sensor adapted to detect the laser beam with high accuracy.

BRIEF DESCRIPTION OF THE DRAWINGS

These and other objects or features of the present invention will become apparent from the following description of a preferred embodiment thereof taken in conjunction with the accompanying drawings, in which.

In the following description, like parts are designated by like reference numbers throughout the several drawings.

DESCRIPTION OF THE PREFERRED EMBODIMENT

A laser scanning optical system embodying the invention will be described below with reference to the drawings.

Figure 1:
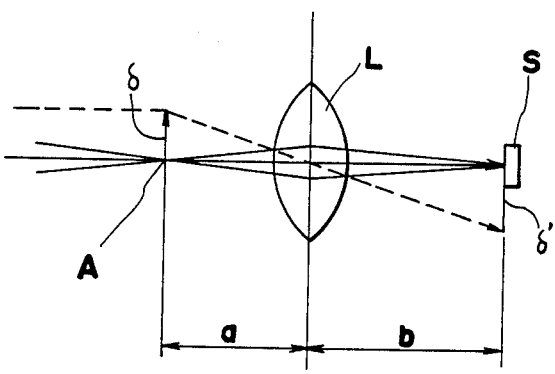
FIG. 1 is a diagram of a conventional laser scanning optical system for illustrating a failure of its SOS, sensor to detect the laser beam due to the defection of the beam.
Figure 2:
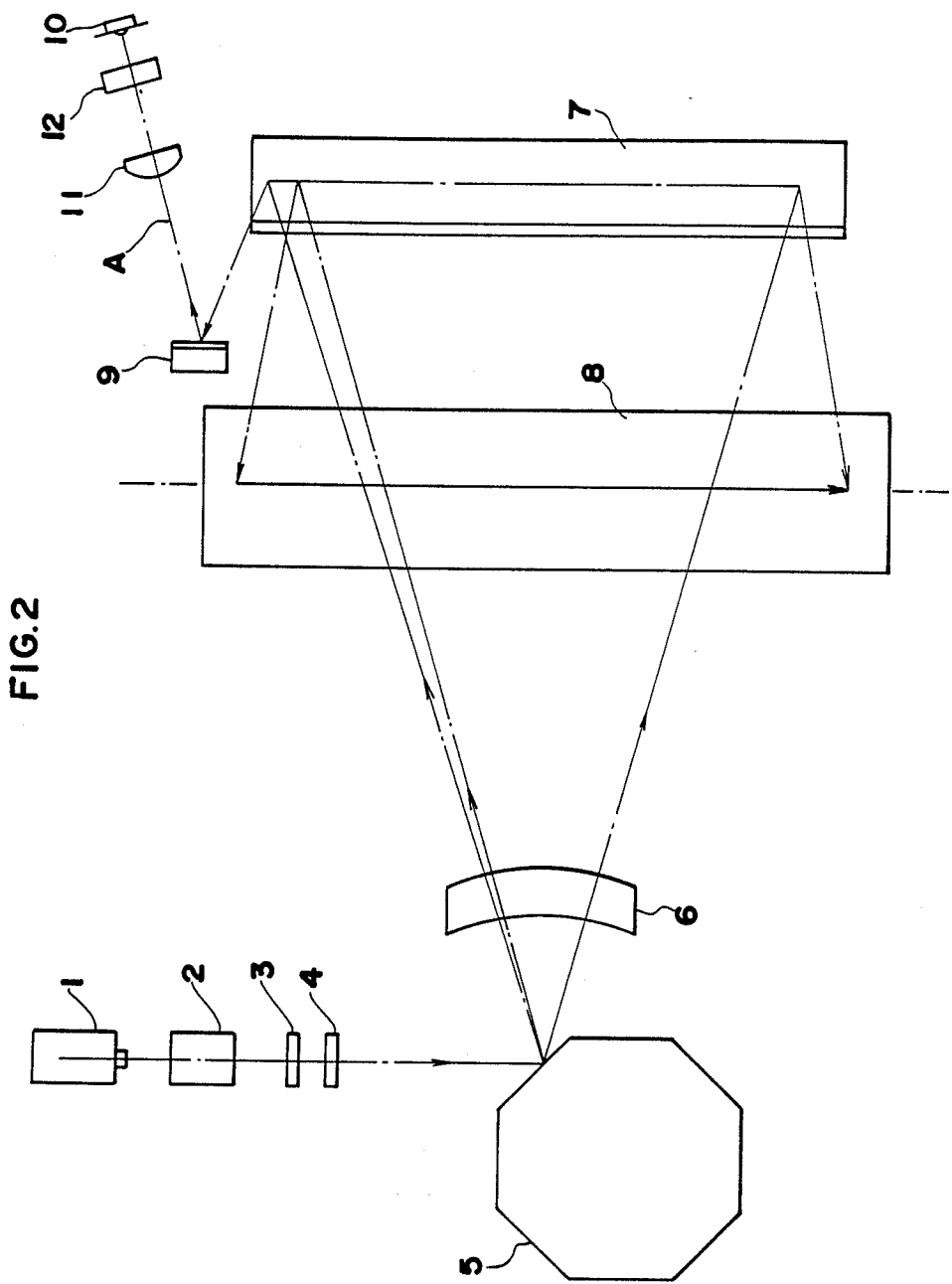
FIG. 2 is a plan view schematically showing a laser scanning optical system embodying the invention.

FIG. 2 is a plan view schematically showing the optical system. A laser beam emitted by a laser oscillator 1 passes through a modulator 2, a collimator lens 3 and a cylindrical lens 4 and impinges on a polygonal mirror 5. The laser beam reflected from the polygonal mirror 5 reaches a photosensitive member 8 via an fθ lens 6 and a reflective mirror 7. The polygonal mirror 5 is rotated at a specified speed to scan the surface of the member 8 with the laser beam. The surface of the photo-sensitive member 8 is scanned with the laser beam at a speed made constant by the action of the fθ lens 6.

When reflected approximately at the scanning start end of the reflective mirror 7, the laser beam is directed by a mirror 9 toward an SOS sensor 10 upon reflection to afford a synchronizing signal. The laser beam reflected at the mirror 9 is led through a first cylindrical lens 11 and a second cylindrical lens 12 to the SOS sensor 10. A position A on the optical path between the mirror 9 and the sensor 10 is equivalent to the surface of the photosensitive member 8 with respect to the fθ lens 6; the surface of the member 8 and the position A are at the same distance from the fθ lens.

With the above arrangement, a horizontal synchronizing signal produced upon the SOS sensor 10 receiving the laser beam determines when to modulate the laser beam for each scanning stroke. In response to the horizontal synchronizing signal, the modulator 2 starts to modulate the laser beam in accordance with the image data to be recorded to form a line image on the photo-sensitive member 8. With the rotation of the member 8, line images are repeatedly formed, whereby an image is formed on the photosensitive member 8 in accordance with the contemplated data.

With the laser scanning optical system described, the SOS sensor 10 may be disposed at any position away from the position A equivalent to the photosensitive member 8. This ensures freedom of design.

The first cylindrical lens 11 has a positive power only in the main scanning direction and is interposed between the position A and the SOS sensor 10 so that the position A and the sensor 10 are in conjugate relation with each other. The first cylindrical lens 11 is so arranged that it has a magnification greater than 1 with respect to the main scanning direction.

On the other hand, the second cylindrical lens 12 has a positive power only in the subscanning direction perpendicular to the main scanning direction and is interposed between the position A and the SOS sensor 10 so that the position A and the sensor 10 are in conjugate relation with each other. Further the second cylindrical lens 12 is so arranged that it has a magnification smaller than 1 with respect to the subscanning direction.

A description will now be given of the functions of the first and second cylindrical lenses 11, 12 included in the laser scanning optical system.

Figure 3:
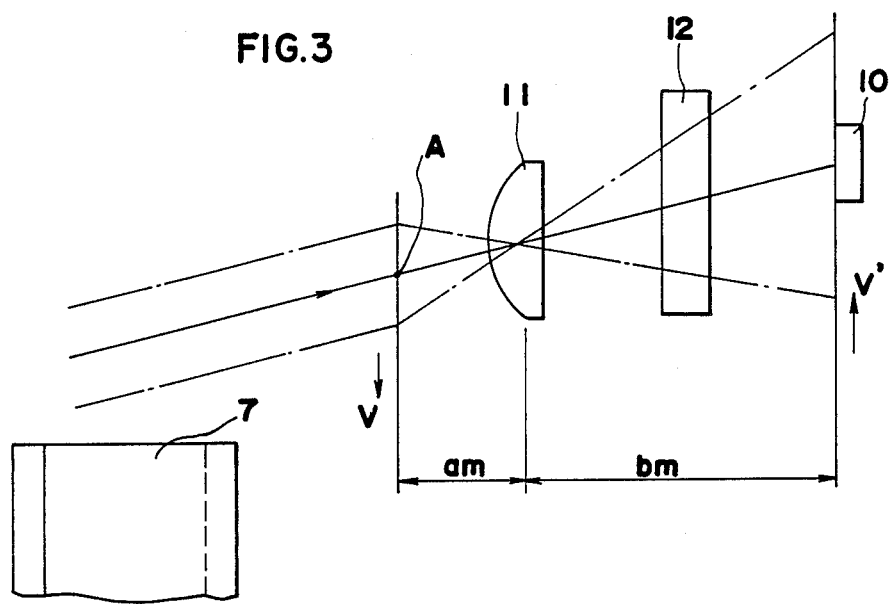
FIGS. 3 and 4 are an enlarged fragmentary plan view and side elevation, respectively, of the laser scanning optical system shown in FIG. 1.

When the laser beam moves in the main scanning direction at a velocity V through the position A equivalent to the photosensitive member 8 with the rotation of the polygonal mirror 5 as seen in FIG. 3, the laser beam passing through the first cylindrical lens 11 moves on the SOS sensor 10 in the opposite direction at a velocity V'. Suppose the distance between the position A and the first cylindrical lens 11 is am, and the distance between the lens 11 and the SOS sensor 10 is bm. Since the magnification (bm/am) is greater than 1, V is smaller than V' (V'=bm/am·V). Accordingly, the scanning velocity V' on the SOS sensor 10 is greater than the scanning velocity V on the surface of the photosensitive member 8. This makes it possible to expedite the rise of the synchronizing signal obtained by the SOS sensor 10 and thereby diminish the error involved in synchronization.

Figure 4:
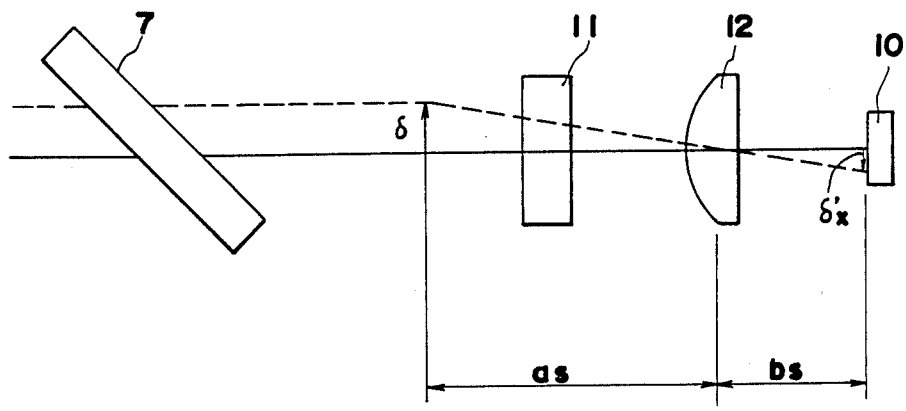

On the other hand, it is likely that the laser beam to be concentrated at the position A will deflect in the subscanning direction by an δ amount owing to an inclination of the axis of rotation of the polygonal mirror 5 or errors in installing optical elements as seen in FIG. 4. The laser beam through the second cylindrical lens 12 then impinges on the SOS sensor 10 as deflected by an amount δx. Suppose the distance between the position A and the second cylindrical lens 12 is as, and the distance between the lens 12 and the SOS sensor 10 is bs. Since the magnification (bs/as) is smaller than 1, δ is greater than δx (δx=bs/as·δ). Thus, the amount of deflection δx on the SOS sensor 10 is smaller than the amount of deflection δ at the position A. This precludes the deflection of the projected laser beam from the SOS sensor 10 and permits the use of a smaller sensor as the SOS sensor 10.

Toric lenses or lenses having cylindrical surfaces on the opposite sides may be used in place of the first and second cylindrical lenses 11, 12.

The first cylindrical lens 11 is so arranged as to have a magnification of greater than 1 in the main scanning direction according to the foregoing embodiment so as to diminish the synchronization error, whereas if such an arrangement need not be resorted to since the synchronization error is allowable, the second cylindrical lens 12 only may be provided, or the second cylindrical lens 12 may be replaced by a usual condenser lens having power in directions including the subscanning direction. However, to prevent the deflection of the projected laser beam from the SOS sensor, the usual condenser lens substituting for the second cylindrical lens 12 must also be so arranged that the magnification is smaller than 1.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. In a laser scanning optical system which scans a beam receiving surface with a laser beam in a scanning direction, improvement comprising,
    a sensor disposed at a position beyond a specific position equivalent to said beam receiving surface and receiving the laser beam for commanding start of modulation of the laser beam, and
    a lens unit means which is interposed between said specific position and said sensor to maintain a conjugate condition therebetween and to provide a magnification smaller than 1 in a direction perpendicular to the scanning direction.

2. The invention as claimed in claim 1, wherein said lens unit means further provides a magnification greater than 1 in the scanning direction 3. The invention as claimed in claim 2, wherein said lens unit includes
    a first lens element having a positive power only in the direction perpendicular to the scanning direction and interposed between said concentrated position and said sensor maintain to a conjugate condition therebetween, the first lens element providing a magnification smaller than 1 in a direction perpendicular to the scanning direction; and
    a second lens element having a positive power only in the scanning direction and interposed between said concentrated position and said sensor to maintain a a conjugate condition therebetween, the second lens element providing a magnification greater than 1 in the scanning direction.

4. A laser scanning optical system which scans a beam receiving surface with a laser beam modulated based on image information, the system comprising:
    scanning means for scanning the beam receiving surface with the laser beam in a scanning direction;
    converging means for converging the laser beam on the beam receiving surface;
    a sensor arranged to receive the laser beam which has passed through a specific position equivalent to the beam receiving surface for generating a synchronizing signal for commanding the start of modulation of the laser beam;
    a first lens element having a positive power only in direction perpendicular to the scanning direction and interposed between said specific position and said sensor so as to keep a conjugate condition therebetween, the first lens element providing a magnification smaller than 1 in the direction perpendicular to the scanning direction; and
    a second lens element having a positive power only in the scanning direction and interposed between said specific position and said sensor so as to keep a conjugate condition therebetween, the second lens element providing a magnification greater than 1 in the scanning direction.

5. A laser scanning optical system for scanning a photosensitive surface with a laser beam modulated based on image information, the system comprising:

a rotatable polygonal mirror for scanning the photosensitive surface with the laser beam in a scanning direction;

a lens unit for converging the laser beam reflected by said polygonal mirror on the photosensitive surface;

a first reflection mirror for reflecting the laser beam passed though said lens unit to the photosensitive surface;

a second reflection mirror for reflecting the laser beam reflected by a part of the first reflection mirror approximately at the scanning start end;

a sensor arranged to receive the laser beam which is reflected by the second reflection mirror and has passed through a specific position equivalent to the photosensitive surface for generating a synchronizing signal for commanding the start of modulation of the laser beam; and a first and second lens element, both interposed between the specific position and the sensor so as to keep a conjugate condition therebetween, the first lens element having a positive power only in direction perpendicular to the scanning direction, a second lens element having a positive power only in the scanning direction, wherein the system fulfills the following condition;

$b_s/a_s < 1$ $b_m/a_m > 1$ $a_s$: the distance between the specific position and the first lens element, $b_s$: the distance between the first lens element and the sensor, $a_m$: the distance between the specific position and the second lens element and $b_m$: the distance between the second lens element and the sensor.

* * * * *